A. C. & T. R. BELL.
ALTERNATING CURRENT MOTOR.
APPLICATION FILED JULY 14, 1910.
1,089,815.
Patented Mar. 10, 1914.
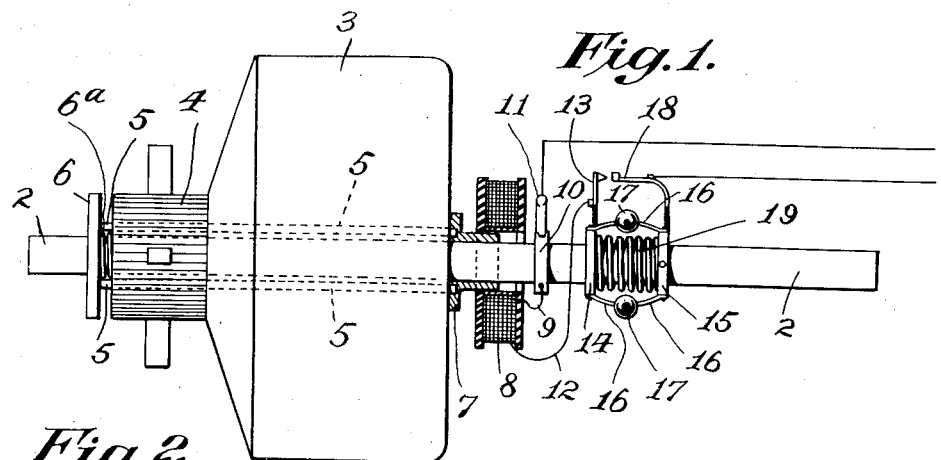
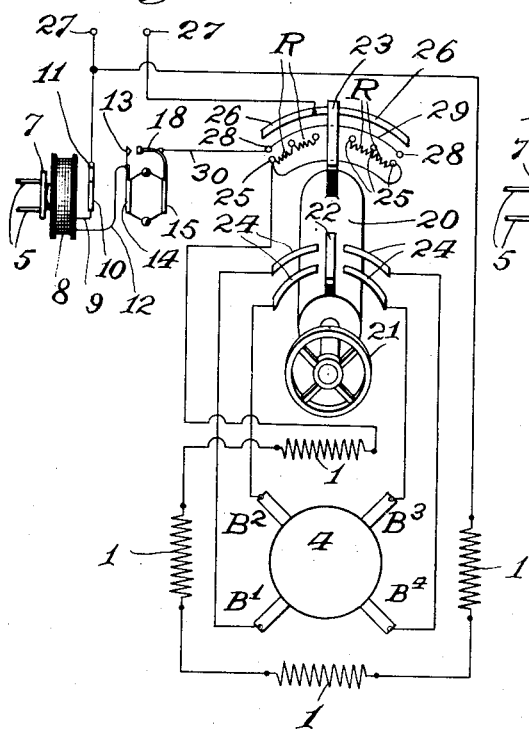
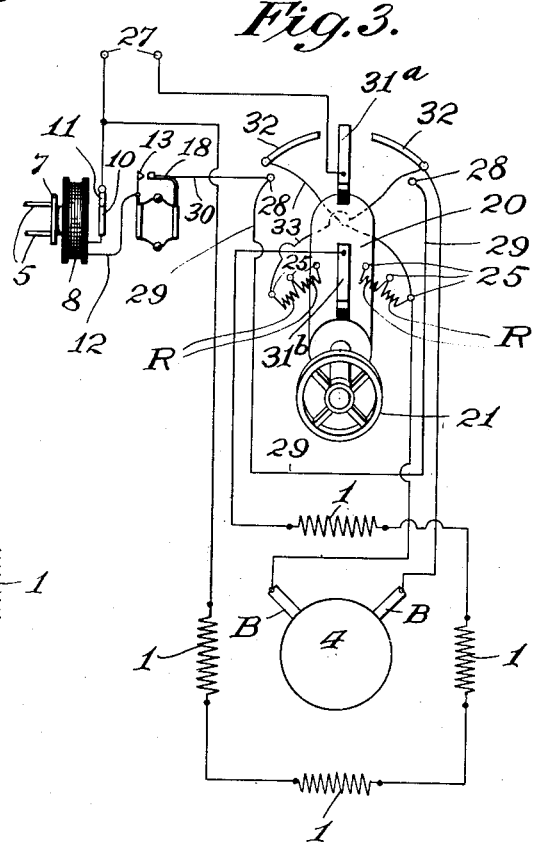
Attest:
Inventors:
Alonzo C. Bell and
Thaddeus R. Bell
by Geo. Scherr Jr. Atty.

UNITED STATES PATENT OFFICE.

ALONZO C. BELL AND THADDEUS R. BELL, OF WESTFIELD, NEW JERSEY.

ALTERNATING-CURRENT MOTOR.

1,089,815.        Specification of Letters Patent.    Patented Mar. 10, 1914.

Application filed July 14, 1910.   Serial No. 571,888.

*To all whom it may concern:*

Be it known that we, ALONZO C. BELL and THADDEUS R. BELL, citizens of the United States, residing at Westfield, in the county of Union and State of New Jersey, have invented certain new and useful Improvements in Alternating-Current Motors, of which the following is a specification.

Our present invention relates to an improved means of short circuiting the commutator of an alternating current motor after same has been brought up to speed, the invention applying equally well to such a motor whether it be strated as a repulsion motor or as a series motor or otherwise. Heretofore centrifugal devices for this purpose have been employed which, rotating with the motor shaft, have operated centrifugally when the motor is up to speed and have then actuated a plate or its equivalent into short circuiting contact with the commutator bars. Such a device of proper design was and is satisfactory where the service does not require reversals of the direction of rotation of the motor. The reason why such centrifugal short circuiting devices are not adapted to the latter service is that when the motor is at speed with the centrifugal device short circuiting the commutator, and it is attempted to reverse the rotation of the motor by connecting the other pair of brushes, if it be a repulsion type motor, or to reverse the connection of the brushes with the field coils if it be a motor of the series type, said attempt at reversal will be nullified and ineffective to reverse the rotation, because the centrifugal device by its momentum will persist in keeping the commutator short circuited and therefore will render fruitless the connecting of the other set of brushes or the reverse connecting of the armature with the fields. This serious difficulty has prevented the use of centrifugally short-circuited alternating current motors in any service where frequent reversals of rotation are required as in hoist or elevator work, etc.

Our present invention extends the field of the alternating current motors with short circuiting attachment to elevator service and the like. The motor is also equally applicable to service where the motor runs in one direction only.

The drawings show some of the forms which our invention may take, said drawings for purposes of clearness being diagrammatic rather than otherwise.

In them, Figure 1 is an elevation of devices within our invention shown in connection with the rotor part of a motor; Fig. 2 is a diagram showing our invention applied to an alternating current motor of the repulsion type; and Fig. 3 is the same showing the invention applied to an alternating current motor of the series type.

We will now describe the devices of the drawings, reserving it to the claims to point out the novel features and to define the scope of the invention, it being understood that the claims will be given due range of equivalents. The invention is shown applied to two types of single phase motor, one which starts on the repulsion principle, Fig. 2, and the other which starts on the series principle, Fig. 3.

Describing the invention in connection first with the repulsion type of motor, 1 are the field coils, 2 the shaft, 3 the armature on the shaft, 4 the commutator. 5 are endwise slidable rods extending through the core of the armature and commutator. 6 is a short circuiting metal plate secured to the ends of the rods 5 and adapted to be pulled by them into short circuiting contact with the ends of the commutator bars; 6$^a$ is a spiral spring surrounding the shaft and located between the plate 6 and the end of the commutator, said spring normally keeping the plate out of short circuiting contact with the commutator. 8 is a solenoid mounted on the motor shaft. 7 designates the core of the solenoid slidable on the motor shaft and connected with the ends of the rods 5, whereby when the solenoid is energized it attracts the core 7 and through the rods 5 pulls the short circuiting plate 6 into contact with the commutator. One terminal 9 of the solenoid is connected with the collector ring 10 on the motor shaft, upon which bears brush 11. Its other terminal 12 is connected with insulated arm 13 carried by ring 14 slidable on the motor shaft and forming part of a centrifugal device of which 15 is another ring fixedly secured on the motor shaft and connected with the movable ring by jointed levers 16 provided with weights 17, whereby the weights fly outwardly by centrifugal action drawing the ring 14 toward 15 and bringing the arm 13 into electrical contact with the contact 18. Spring 19 acts between the rings 14 and 15 to hold the contacts 13 and 18 normally open in the absence of sufficient centrifugal effect to close them.

Fig. 2 shows the electrical connections. The commutator, the fields, the solenoid, and the above described centrifugal device, are indicated in this figure by corresponding designating numerals. As to the brushes, it may be noted that there are four brushes arranged as well known so that when two of them, such as brushes B' and B² are connected, the motor rotates in one direction, whereas when the other brushes B³ and B⁴ are connected it rotates oppositely. In addition, Fig. 2 shows a diagram of a controller. Thus 20 indicates a cylinder operable to rotate about its axis to right and left by hand wheel 21 or otherwise. 22 and 23 are metal blades projecting radially from the cylinder. There is a pair of contacts 24 on each side of the cylinder, consisting of metal strips positioned so that when the cylinder is rotated in one direction or the other, its blade 22 sweeps over them and electrically connects one pair of contacts or the other. It will be seen that this results in connecting the brushes B' and B², or the brushes B³ and B⁴ with the result that the motor rotates in one direction or the other. The other blade 23 of the controller swings over contact points 25 connected by resistance R and in addition swings over conducting strips 26 which it serves electrically to connect with the contact points. 27 indicates the mains of the current supply and it will be seen that the field coils 1 and the controller are connected in series across said mains, and that as the controller is moved either to right or left in Fig. 2, it throws the current on the fields when it reaches the first contact point 25 with the maximum resistance of the controller interposed and that as it reaches the succeeding points 25 it successively cuts out resistance until the field coils are connected directly across the mains. 28 designates contacts which the blade 23 touches when in its final or intended operating position in either direction. These contacts are connected by the wire 29 and are further connected by wire 30 with contact 18 of the centrifugal device. It will be seen that the contacts 26 and 28 of the controller, and the contacts 13 and 18 of the centrifugal device, are in series with the solenoid 8, whence it follows that the solenoid will be energized to short-circuit the commutator, whenever both sets of contacts are closed, but not if either set is open.

The operation is as follows: The operator moves the controller in one direction or the other depending upon the direction he wishes the motor to run. If he swings the controller to the left, the blade 22 will short circuit the brushes B' and B² and the other blade 23 will connect the fields with the supply and the motor will start up as a repulsion motor. As he continues swinging the controller to the left, he will finally cut out all of the resistance R, at which stage the blade will be on the last of the contacts 25 and also will be bridging the gap between the conducting strip 26 and the contact 28. Thereupon, if the motor has already built up its speed, or at any rate as soon as it does build up to speed sufficient to operate the centrifugal device, the contacts 13 and 18 of said device will be closed, and the solenoid circuit being now complete, the solenoid will be energized and will attract its armature 7 and operate the plate 6 to short circuit the commutator (compare Fig. 1). To reverse the motor, the operator will swing the controller to the right in Fig. 2 and in so doing will break the solenoid circuit, the moment the blade 23 leaves the contact 28, whereupon the solenoid being deënergized, the spring 6ᵃ will actuate the short circuiting plate 6 out of contact with the commutator. In short, the commutator will no longer be short circuited, in spite of the fact that the centrifugal device may still persist in keeping its own contacts 13 and 18 closed, due to the momentum of the motor before its reversal can be effected. The commutator being no longer short circuited, the motor, of course, responds to the reverse movement of the controller and runs in the opposite direction when the blade 22 has connected the brushes B³ and B⁴. The other blade 23 having reached the end of its right hand throw in Fig. 2, it bridges the contacts 26 and 28, whereupon when the motor is up to sufficient speed to close the centrifugally controlled contacts 13 and 18, the solenoid is again energized and short circuits the commutator. Thus, it is seen that the commutator short-circuiting means does not interfere with the perfect control of the running direction of the motor.

The diagram of Fig. 3 showing the invention applied to a series motor will now be easily understood. In this case, the mains 27 are connected through the fields 1 to the blades 31ᵃ and 31ᵇ of the controller. 32 are conducting strips with which the blade 31ᵃ swings in contact and 25 are contact points connected by resistance R with which the other blade 31ᵇ swings in successive contact. The end contact points are connected diagonally across with the strips 32 by wires 33. These wires connect with the motor brushes B. The result is that when the controller is swung in one direction it connects the motor brushes, and therefore the armature, in one series relation with the fields, and when swung in the other direction connects said armature and fields in the other series relation, so that the motor rotates reversely.

The rest of the arrangement corresponds with that already described in connection with the repulsion type of motor. Thus, 28 are contact points with which the blade 31ᵃ contacts at the end of its stroke, these being connected with each other by wire 29 and with the stationary contact 18 of the centrifugal device by wire 30, and so forth.

As the operator swings the controller to the left in Fig. 3, the motor starts as a series motor and when the controller is at the end of its stroke and its blade 31ᵃ is on the contact 28, the commutator is automatically short circuited as soon as the motor is up to speed sufficient to operate the centrifugal device to close the contacts 13 and 18. In reversing the motor the controller is moved to the right, whereupon it immediately breaks the solenoid circuit as it leaves the contact 28 which releases the commutator from short circuit, until the controller has been swung to the right to reverse the connection of the brushes and the motor has reversed its rotation and is up to sufficient speed in the opposite direction to again operate the centrifugal device to close its contacts 13 and 18 to complete the solenoid circuit and to energize said solenoid to short circuit the commutator.

It will be noted that the particular electro-magnetic means shown and described for controlling the short-circuiting of the commutator or armature windings of the motor is such that the magnet 8, when energized, effects the short-circuiting against the opposing action of the spring 6ᵃ. Obviously, the functions of the magnet and spring can be reversed so that the spring effects the actual short-circuiting, whereas the magnet will release the commutator from short-circuit. In the latter case, the magnet will be normally energized and the short-circuiting will occur whenever it is deënergized. Furthermore, the motor-controlled contacts 13 and 18 and the manually-controlled contacts at the controller will be normally closed instead of being normally open as in the preferred construction shown and described. In other words, the controller will open its contacts when at the end of its throw and the centrifugal means will do likewise when up to speed.

Having thus described our invention, what we claim is:

1. In combination, a reversible alternating current motor having a commutator, electro-magnetic means controlling the short circuiting of the commutator of the motor, manually controlled contacts, and contacts automatically controlled from the operation of the motor, both sets of contacts being in series circuit with the electro-magnetic means, a current source in said circuit, and means for controlling the direction of rotation of the motor, said means being operatively connected with the aforesaid manually controlled contacts.

2. In combination, a reversible alternating current motor having a commutator, a controller connected with the motor and operable into different positions to operate the motor in one direction or the other, electromagnetic means for short circuiting the commutator of the motor, contacts closed by the controller when in either of its operating positions and otherwise being open, and contacts normally open and being automatically closed by the motor when at given speed, both sets of contacts being in series circuit with the electro-magnetic means, and a current source in said circuit.

3. In combination, a reversible alternating current motor having a commutator, a controller connected with the motor operable into different positions to operate the motor in one direction or the other, electromagnetic means which when energized short circuits the commutator, contacts closed by the controller when in either of its operating positions and being opened as the controller is operated from either of its said positions to the other, normally open contacts which are centrifugally closed from the operation of the motor, both sets of contacts being in series circuit with the electro-magnetic means, and a current source in said circuit.

4. In combination, a reversible alternating current motor having a commutator, a controller connected with the motor for operating it in one direction or the other, electro-magnetic means controlling the short circuiting of the commutator of the motor, and contacts in series circuit with the electro-magnetic means and operated from the controller, and a current source in said circuit.

5. In combination, a reversible alternating current motor having a commutator, a controller connected with the motor for operating it in one direction or the other, electro-magnetic means for short-circuiting the commutator of the motor, and contacts in series circuit with the electro-magnetic means and operated from the controller, said contacts being closed to complete the circuit of the electro-magnetic means when the controller is in either of its final operating positions for running the motor in one direction or the other, said contacts being opened as the controller is operated between said final positions, and a current source in said circuit.

6. In combination, an alternating current motor having a commutator, electro-magnetic means controlling the short-circuiting of said commutator, an automatic means and a non-automatic means which jointly control the operation of the electro-magnetic means to effect the short-circuiting of the commutator and which severally control said electro-magnetic means to release the short-circuit of the commutator, the automatic means being operated from the rotation of the motor, and means for controlling the direction of rotation of the motor, said means being operatively connected with the aforesaid non-automatic means.

In testimony whereof, we have hereunto affixed our signatures in presence of two witnesses.

ALONZO C. BELL.
THADDEUS R. BELL.

Witnesses:
MARTIN BOURKE,
E. W. SCHERR, Jr.